(No Model.)
D. D. BUICK.
FLOAT VALVE.
No. 529,243. Patented Nov. 13, 1894.
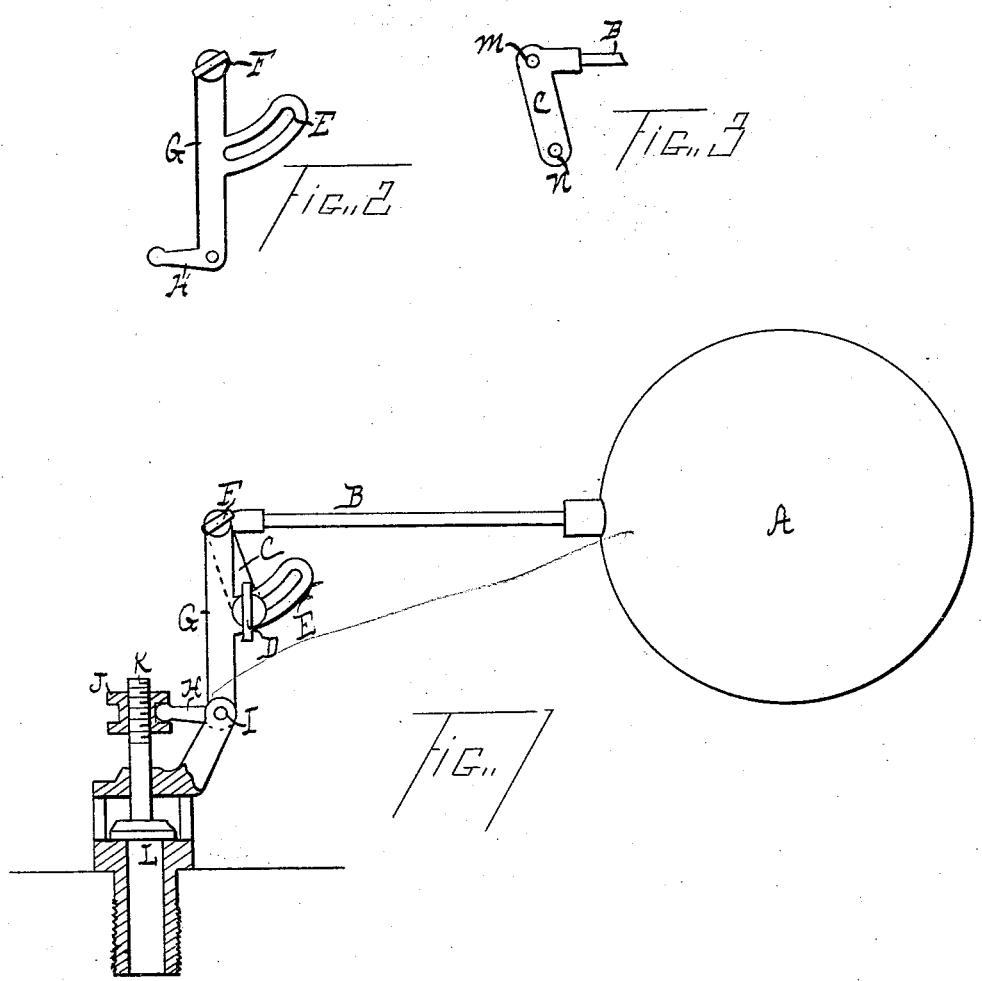

UNITED STATES PATENT OFFICE.

DAVID D. BUICK, OF DETROIT, MICHIGAN.

FLOAT-VALVE.

SPECIFICATION forming part of Letters Patent No. 529,243, dated November 13, 1894.

Application filed April 15, 1893. Serial No. 470,475. (No model.)

*To all whom it may concern:*

Be it known that I, DAVID D. BUICK, of Detroit, in the county of Wayne and State of Michigan, have invented a new and useful Improvement in Float-Valves, of which the following is a specification.

My invention consists in an improvement in float valves, hereinafter fully described and claimed.

Figure 1 is a side elevation with the valve partly in section. Fig. 2 is a detached elevation of the bell crank lever and adjustable float rod, and Fig. 3 is a detailed view of one end of the float-lever.

L represents the valve which is to be controlled by the float, which may be of any known construction, and I represents a bracket carried on said valve.

K represents a valve stem and J a collar on said valve stem, by which the bell-crank lever is connected with the valve.

G and H represent two arms of a bell-crank lever pivoted on the bracket I and the short arm H engaging with the collar J on valve stem K.

A represents a float and B a rod, by which said float is connected with the long arm of the bell crank lever.

It is customary in constructions of this kind to connect the float rod B directly with the long arm of the bell-crank lever and to regulate the desired height of the water, which is controlled by the float by bending the float rod B so as to raise or lower the float. This is not a desirable mode, and it is to avoid the necessity of doing this that my invention is made. I avoid this by making the connections of the float rod B with the arm G of the bell crank lever adjustable.

The float rod B is formed at its end with an L-shaped piece of metal, C, which is provided at its heel with an aperture $m$ to receive a screw or bolt, and at its lower end with a similar aperture $n$. The arm G is provided at its upper end with an aperture for a set screw or bolt F and below this with a curved slot E, whose radius is the disance from $m$ to $n$.

D represents a set screw which passes through slot E and through aperture $n$; either screwing into C or provided with a bolt on the farther side of C. When set screws F and E both engage with the L-shaped piece C and are both set up loosely; it is evident that the piece C will turn on the set screw F as a center and in turning will either raise or lower float A, so that by loosening set screw F and D the float A may be adjusted to the desired height within the range of the parts and then locked into position by setting up screws F and D so that the piece C is firmly locked to the arm G.

What I claim as my invention, and desire to secure by Letters Patent, is—

In combination with a ball valve a bell crank lever G H pivoted on the valve and having its arm H connected with the valve stem, a curved slot E formed on arm G; a float A, a float rod B having its end L-shaped as shown at C, and set screws F and D, substantially as shown and described.

DAVID D. BUICK.

Witnesses:
GERTRUDE H. ANDERSON,
GEO. H. LOTHROP.